(12) United States Patent
Chen et al.

(10) Patent No.: US 9,459,626 B2
(45) Date of Patent: Oct. 4, 2016

(54) LEARNING SIGNS FROM VEHICLE PROBES

(71) Applicant: HERE Global B.V., Veldhoven (NL)

(72) Inventors: Xin Chen, Evanston, IL (US); Di Ma, Chicago, IL (US); Xiang Ma, Chicago, IL (US); Roman Ostrovskiy, Prospect Heights, IL (US); Vlad Zhukov, Chicago, IL (US); Xiaotao Zou, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/567,343

(22) Filed: Dec. 11, 2014

(65) Prior Publication Data

US 2016/0170414 A1    Jun. 16, 2016

(51) Int. Cl.
*G01C 21/00* (2006.01)
*G05D 1/02* (2006.01)
*G05D 1/00* (2006.01)
*G01C 21/34* (2006.01)

(52) U.S. Cl.
CPC ......... *G05D 1/0221* (2013.01); *G01C 21/3407* (2013.01); *G05D 1/0088* (2013.01); *G05D 1/0231* (2013.01); *G05D 2201/0212* (2013.01)

(58) Field of Classification Search
CPC .............. G08G 1/0104; G01G 1/096844; G01G 1/052; G01C 21/32; G09B 29/106; G06K 9/6202; G06K 9/00791
USPC .......... 701/27, 57, 58, 97, 119; 707/999.102, 707/999.104, E17.018
See application file for complete search history.

(56) References Cited

U.S. PATENT DOCUMENTS

| | | | |
|---|---|---|---|
| 7,058,206 B1 | 6/2006 | Janssen et al. | |
| 8,370,755 B2 | 2/2013 | Buecker et al. | |
| 8,428,307 B2 | 4/2013 | Bradai et al. | |
| 8,725,394 B2 | 5/2014 | Bahlmann et al. | |
| 9,092,695 B1* | 7/2015 | Ogale | G06K 9/6202 |
| 2009/0138497 A1* | 5/2009 | Zavoli | G01C 21/32 |
| 2012/0046855 A1 | 2/2012 | Wey et al. | |
| 2012/0065873 A1* | 3/2012 | Van de Velde | G08G 1/0104 701/119 |
| 2014/0063232 A1 | 3/2014 | Fairfield et al. | |

OTHER PUBLICATIONS

Automatically Adjust to Speed Limits With Siemens Car Camera. pdf, Oct. 16, 2006, Tech Freep Automotive.

* cited by examiner

*Primary Examiner* — Marthe Marc-Coleman
(74) *Attorney, Agent, or Firm* — Lempia Summerfield Katz LLC (57) ABSTRACT

Systems, methods, and apparatuses are disclosed for identifying road signs along a roadway segment from vehicle probe data. Probe data is received from vehicle sensors at a road segment, wherein the probe data includes observed static objects along the road segment. Road signs are identified within the observed static objects of the probe data using a logistic regression algorithm. The geographic location of the identified road signs are determined using a linear regression algorithm.

20 Claims, 6 Drawing Sheets

LEARNING SIGNS FROM VEHICLE PROBES

FIELD

The following disclosure relates to identifying road signs along a roadway segment from vehicle probe data.

BACKGROUND

Traffic reporters may rely on traffic information made available by government agencies. Also, online traffic reporting resources may suffer from infrequent updates, data entry errors, or delayed data input. These factors cause the traffic reporter to fail to timely report a major traffic incident or congestion, or continue to report an incident or congestion well after the incident or congestion has been cleared. Therefore, providing real time, accurate traffic information, such as for use in a navigation system (and, in particular, for an autonomous vehicle), is a continuing effort.

To enable automated driving, route validation and planning beyond a vehicle's sensor range is important. For example, it is important to accurately and timely detect low latency road condition changes and abnormalities such as lane closures and slipperiness of the road. Detection of road condition changes or abnormalities is also important for lane positioning as the road structure and identified objects may function as references for matching vehicle sensor perception. Near real-time updates of the road structure and objects may provide correct lane positioning for the automated vehicle navigation system.

SUMMARY

Systems, methods, and apparatuses are provided for identifying road signs along a roadway segment from vehicle probe data.

In one embodiment, the method comprises receiving, using a processor, probe data from vehicle sensors from a plurality of vehicles at a road segment, the probe data comprising observed static objects along the road segment. The method further comprises identifying, using a logistic regression algorithm, road signs within the observed static objects of the probe data. The method further comprises determining, using a linear regression algorithm, a geographic location each identified road sign along the road segment.

In one embodiment, the apparatus comprises at least one processor and at least one memory including computer program code for one or more programs; the at least one memory and the computer program code configured to, with the at least one processor, cause the apparatus to at least perform: (1) receive probe data from vehicle sensors from a plurality of vehicles at a road segment, the probe data comprising observed static objects along the road segment; (2) identify, using a logistic regression algorithm, road signs within the observed static objects of the probe data; and (3) determine, using a linear regression algorithm, a geographic location each identified road sign along the road segment.

BRIEF DESCRIPTION OF THE DRAWINGS

Exemplary embodiments are described herein with reference to the following drawings.

DETAILED DESCRIPTION

The following embodiments include identifying road signs along a roadway segment from vehicle probe data.

As used herein, a "road" or "roadway" may refer to any traveling lane or pathway that may be capable of being monitored for traffic congestion/incident detection, or may become capable of being monitored for traffic congestion/incident detection in the future (e.g., a highway, city street, bus route, train route, walking/biking pathway, waterway).

Collecting Vehicle Probe Data

Road signs for a selected road segment may be determined through the collection, reporting, and analysis of vehicle probe data from a vehicle or a plurality of vehicles. In certain embodiments, for each vehicle, the vehicle probe data is collected by at least one vehicle sensor. The vehicle sensors are configured to identify the surroundings and the location of the probe vehicle (e.g., car, truck, motorcycle, bicycle, bus). The sensors may include Global Positioning System (GPS) identification, light detection and ranging (LIDAR), radar, and/or cameras for computer vision. Proximity sensors may aid in parking the vehicle. The proximity sensors may detect the curb or adjacent vehicles.

In other embodiments, vehicle probe data may be collected with a navigation device transported in or on a probe vehicle. The navigation device may be configured to calculate probe data such as geographic location, speed, and/or heading of the probe vehicle or traveler. The probe data may include speed, heading, location, timestamp, etc., as obtained from a single sensor such as GPS or a combination of sensors such as GPS, accelerometer, and gyrometer. In certain embodiments, the navigation device generates a message that provides at least one of (1) geographic location, (2) speed, (3) heading, and/or (4) vehicle identification (including timestamp), and sends the message to a server for processing.

In certain embodiments, the probe vehicle is an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

Figure 1:
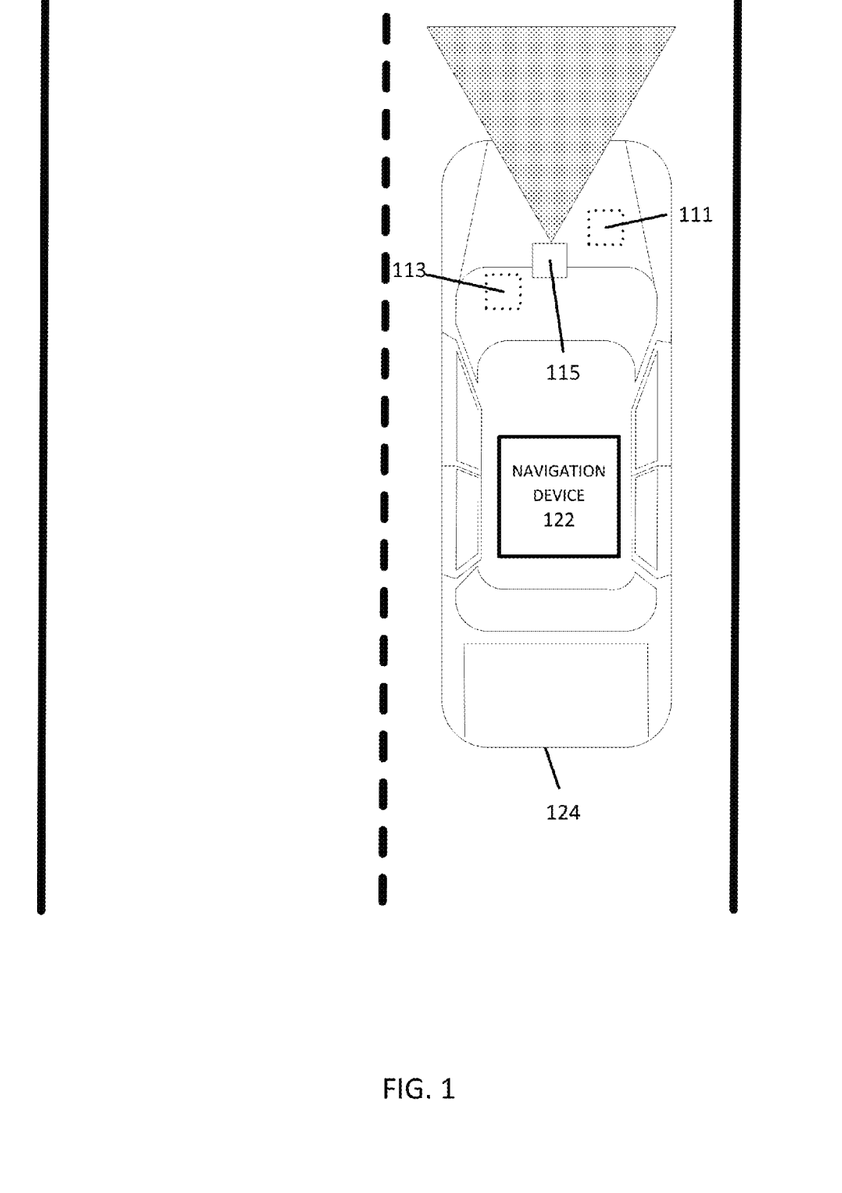
FIG. 1 illustrates an example of a vehicle comprising camera or image sensors for identifying surrounding data, such as road signs near the vehicle.

FIG. 1 illustrates example sensors for a vehicle 124. For example, an engine sensor 111 may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. A vehicle sensor 113 may include a steering wheel angle sensor, a speedometer sensor, or a tachometer sensor.

A vehicle sensor 115 may be a camera, a light detection and ranging (LIDAR) sensor, a radar sensor, or an ultrasonic sensor. A vehicle sensor 115 may determine road status such as the shape or turns of the road, the existence of speed bumps, the existence of pot holes, the wetness of the road, or the existence or ice, snow, or slush.

In certain embodiments, a vehicle sensor 115 (e.g., camera) may identify lane or guide markings on the road, such as the left and right boundaries of the lane the vehicle is traveling (i.e., the current lane), as well as any immediate adjacent lane boundaries (i.e., the adjacent left lane boundary and the adjacent right lane boundary), to the extent the adjacent lanes exist. In some embodiments, the vehicle sensor 115 (e.g., camera) may identify additional lane lines beyond the immediate adjacent lane boundaries (to the extent additional lanes are present).

A vehicle sensor 115 may also identify the angle between the trajectory path of the vehicle and a lane marking. A vehicle sensor 115 may also be able to gather information to determine the vehicle's distance from the current lane's left or right boundary.

In certain embodiments, a vehicle sensor 115 (e.g., radar sensor) may detect stationary (static) and/or moving (dynamic) objects in the vicinity of the vehicle sensor. In certain embodiments, the stationary or static object is a road sign, road curb, barrier, or guard rail. The vehicle sensor 115 may be able to detect the type or category of static object or road sign. For example, the sensor may be able to detect if the road sign is a speed limit sign. In certain embodiments, the sensor may be able to determine whether the road sign is a "fixed" road sign or a "variable" road sign. A fixed sign displays an unchanging message and a variable sign may display a changing message. In certain embodiments, the fixed road sign is a fixed speed limit sign (e.g., a speed limit sign with a printed value of 80 km/hr), distance marker, street sign, or road traffic sign. A variable road sign may be a variable speed sign (VSS) or a variable message sign.

For instance, a variable speed sign (VSS) or variable message sign may be used on a roadway to give travelers information about the road ahead. Speed limit values may be displayed on electronic signs positioned next to the road, over a portion of the traffic lanes, or overhead each traffic lane. In certain embodiments, the electronic signs may be displayed on a gantry extending over a portion of the roadway. In certain embodiments, the electronic sign(s) may include variable speed limit values. The signs may also include additional text such as "CAR" or "TRUCK," to provide additional information regarding which vehicles the displayed speed limit value pertains (e.g., the variable speed limit value for a car could be 60 while the speed limit value for a truck could be 50).

In certain embodiments, the vehicle sensor 115 may be programmed to identify a fixed road sign or a variable sign and read or capture the displayed speed limit value or message.

The vehicle sensor 115 may also be programmed to track the static object (e.g., road sign) from a time of first detection until a time in which the vehicle passes the static object location along the road segment (or otherwise loses sight of the object from the periphery of its camera sensor). The vehicle sensor 115 may correspond with the vehicle navigation device system or processor or otherwise note the time and location that the vehicle lost sight of the static object (e.g., road sign).

Reporting Probe Data

The vehicle or navigation device may communicate with an external database via a connected network, wherein the probe data collected from the navigation device or vehicle sensors may be transmitted through the network and stored in a map developer database or server.

In certain embodiments, the probe data comprises metadata collected from the various vehicle sensors, such as a camera sensor. For example, the vehicle camera sensor may analyze the road images for static objects (such as road signs) and store its analyzed data within the vehicle or navigation database for eventual reporting to an external network. Probe data from one vehicle may be combined with probe data from additional vehicles traveling along the same road segment.

The vehicle or navigation device may provide real-time reporting of probe data to the external, map developer database. Alternatively, the vehicle or navigation device may transmit collected data at defined intervals of time, or at variable times (e.g., upon identification of a road sign). For example, collected data from the vehicle sensor may be transmitted to an external database at a time when the vehicle passes the static object location along the road segment or otherwise loses sight of the object from the periphery of its camera sensor.

The transmitted probe data may then be analyzed by a processor within the map developer system.

Identification of Road Signs

In certain embodiments, transmitted probe data (e.g., metadata) from one or more vehicles may be used to (1) identify a road sign and (2) determine the location of the identified road sign.

Identification of the road signs from the metadata may be performed using a machine learning algorithm. In some embodiments, the machine learning algorithm employs a logistic regression analysis to detect or identify a road sign. In certain embodiments, the logistic regression analysis uses a point based classification to identify a road sign. For instance, for each probe point detected as a static object (e.g., road sign), the probe point is further classified as a sign or no-sign, and a bounding box is created around the point, wherein other observations within bounding box are analyzed and compared with the observed static object/road sign. For example, a bounding box may be a 10 meter by 10 meter box (i.e., 10 m×10 m box), a 20 m×20 m box, a 30 m×30 m box, a 40 m by 40 m box, or a 50 m×50 m box.

In certain embodiments, the identified static object/road sign within the bounding box is combined or merged with other similarly identified objects/road signs within the bounding box. The merger is performed because one sign may have multiple instances of detection by the vehicle sensor due to occlusions, lighting conditions that might make the camera lose track of the sign, etc.

In certain embodiments, in order to train the processor's identification the presence or absence of a road sign (or a type of road sign), the identifications may be verified with ground truth data or street view images.

Figure 2:
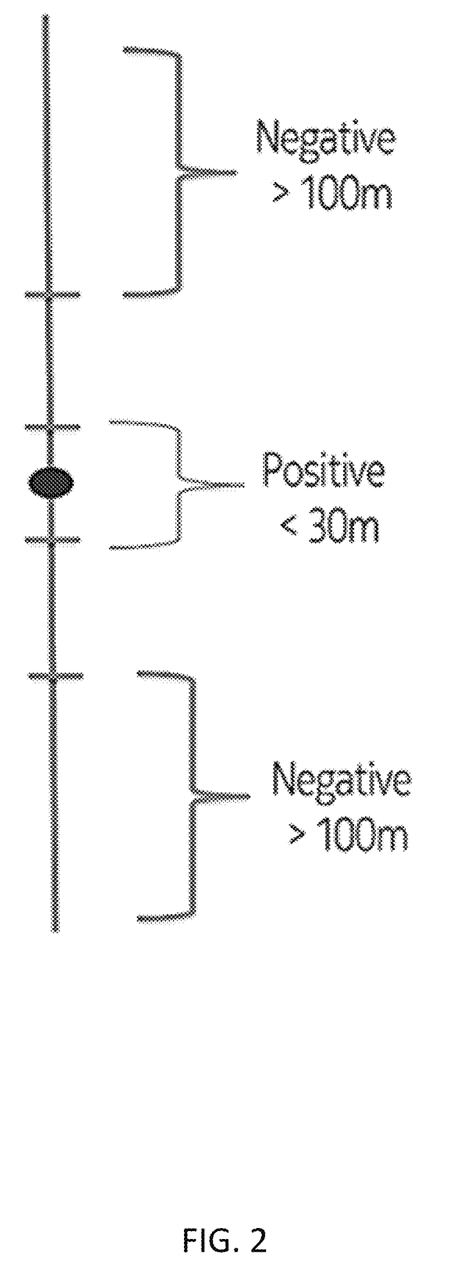
FIG. 2 illustrates an example of positive and negative observation ranges for a machine learning system.

FIG. 2 provides one embodiment of how the algorithm may be trained to identify road signs. In this embodiment, positive and negative examples are used for training. For example, an observation of a static object within 30 meters of the ground truth position is defined as a positive example of an accurate detection of a road sign, while an identification of a road sign beyond 100 meters of the ground truth position is defined as a negative example. In this training example, road signs identified within 30-100 meters of the ground truth position are discarded from further analysis.

In the training example, a 5 meter interval is sampled in the positive and negative range. Each example includes observations within a 30 meter×30 meter bounding box. In this example, 4,233 positive examples and 2,140 negative examples are created for training. Through logistic regression, the machine learning algorithm predicts the presence or absence of a road sign from the interval sampled. The algorithm weighs various features in its analysis, wherein the ratio of the number of observations to the number of passes of the vehicle, the speed of the vehicle, the number of observations, and the number of passes of the vehicle are weighted. In one embodiment, the ratio of the number of observations to the number of passes of the vehicle is weighed higher than the speed of the vehicle, which in turn is weighed higher than the number of observations, which in turn is weighed higher than the number of passes of the vehicle.

In this example, a 10-fold cross-validation with the ground truth data was conducted to analyze the expected accuracy of the trained model. As shown in the table below, there were 5950 correct classifications, providing a precision rate of 93.4%. There were 423 incorrect classifications (6.6%). The true positive rate, or the recall rate for identifying a sign within an individual bounding box was 86.3%, and the false positive rate for identifying a sign where there was no sign was 3.0%.

| Ground Truth | Prediction | | Recall Rate |
|---|---|---|---|
| | No Sign | Sign | |
| No Sign | 4104 | 129 | 97% |
| Sign | 294 | 1846 | 86.3% |
| Precision Rate | 93.3% | 93.5% | |

Placement of Road Signs

Once a road sign or other targeted static object is identified, the location or placement of the sign/object is determined. In certain embodiments, a machine learning algorithm is used to determine the location of the sign. A linear regression analysis may be used by the machine learning algorithm to place the sign.

In certain embodiments, the vehicle probe metadata, such as the speed of the vehicle and the location of the vehicle, are used in the linear regression analysis to place the location of the sign. In some embodiments, through tracking of the sign along a distance, multiple observation points from the vehicle sensor are compiled and used to place the location of the sign. Further, in some embodiments the last observed location point by the vehicle sensor may be used to determine the location of the sign, as the sign may be lost outside the periphery of the vehicle sensor and considered to be approximately perpendicular to the vehicle.

A combination of multiple vehicle observations may also be used in the linear regression analysis, wherein signs identified within a defined bounding box are considered to be the same sign, and each vehicle's observations of the sign location are combined together in the analysis.

In some embodiments, the algorithm may distinguish fixed road signs and variable road signs (e.g., variable speed signs) in its determination of the sign's location along the road segment. Therefore, a vehicle sensor's identification of the type of road sign detected may be a factor in the analysis of the sign's physical location along the road segment.

In certain embodiments, in order to train the machine learning algorithm's determination of the sign location, the algorithm calculations may be verified with ground truth data or street view images. In some embodiments, the ground truth data set in this evaluation is separate from the ground truth data used to verify and train the machine learning algorithm in the identification of the sign.

In one example, a ground truth data set of 148 fixed road signs and 32 variable road signs were placed along a road segment. Using vehicle camera sensors and the machine learning algorithm, the physical location of the road signs were determined. The table below depicts the placement accuracy of the identified signs. For example, 91% of the fixed road sign locations were calculated within 30 meters of their actual location, 81% of the fixed road sign locations were determined to be within 15 meters of their actual location, and so on. Additionally, 97% of the variable road sign locations were determined to be within 30 meters of their actual location, 94% of the variable road sign locations were determined to be within 30 meters of their actual location, and so on.

| | Distance to GT | | | |
|---|---|---|---|---|
| Type | 30 m | 15 m | 10 m | 5 m |
| Fixed | 134 (91%) | 120 (81%) | 89 (60%) | 25 (17%) |
| Variable | 31 (97%) | 30 (94%) | 23 (72%) | 9 (28%) |

In some embodiments, the road sign identification and location calculations may be compared with alternative approaches, such as a clustering-based approach for road sign identification. The comparisons may provide that this machine learning based approach detects less false positives and provides a more robust analysis under various environmental conditions.

Map-Matching the Road Signs

Following identification of the road signs and determination of the road sign locations, the results may be stored or published within the map developer database. In some embodiments, the sign placement position is map-matched to surface path of the road segment. In the map-matching process, the identified sign is aligned with the edge of the road or a specific lane on the road. The map-matching process may consider both the geographic location and heading of the vehicle(s). In other words, the map-matching process may compare the distance between the probe data and the road, as well as the heading value of the probe and the heading value of the road.

In certain embodiments, the map-matching process matches the identified road sign to the edge of the road or lane on the road based on characteristic information of the road or lane (e.g., whether the road is a highway, residential street, three-lane road, or two-lane road). Additionally, the map-matching process may take into account the accuracy of the positioning technique for the navigation device or vehicle sensor of the probe vehicle(s). For example, when GPS is used, accuracy depends on the line of sight to the sky.

GPS may perform better in open rural areas than in urban areas or areas with other cover. The database used in the map-matching process may include data indicative of GPS accuracy. The data indicative of GPS accuracy may describe whether or not specific geographic locations are considered an urban canyon, which is defined as an area dominated by tall buildings. Tall buildings may partially block GPS signals. The data indicative of GPS accuracy may indicate city or rural, may be a distance, or may be a value on a rating scale (e.g., 1 to 10). The data indicative of GPS accuracy may be derived from a building model stored in the database. The building model describes the two-dimensional footprint or the three-dimensional size of buildings. The server may access the building model and compare the relative sizes of buildings near the geographic location of the mobile device in the probe vehicle or on the traveler to a threshold level. Alternatively, the GPS accuracy for different locations is stored and accessed, received from the mobile device, or otherwise calculated.

The map-matching process may also take into account baseline data determined from historical data. The historical data may be location points collected from vehicles following the same route. For example, probe vehicles may report a current geographic location positioned at a regular interval (e.g., every minute, every 20 seconds). Alternatively, the location points may be collected in response to requests sent from the server. The server may be configured to filter the data. For example, outliers may be removed. In addition, the server may average sets of collected location points to calculate the baseline. The sets of collected location points may be grouped in clusters dependent on the proximity of the location points with respect to one another.

Reporting to Service Provider, Map Developer, or End-User

In some embodiments, the identified/located road sign results may be reported to a third-party traffic service provider or map developer. In other embodiments, the identification/location of the road signs may be reported to an end-user navigation device (e.g., a vehicle navigation device or a vehicle operator/passenger navigation device) over a connected network. The updates to the map database and reports to the traffic provider, map developer, or end-user navigation device may take place in real-time, at defined increments in time, or at the request of the traffic provider, map developer, or end-user.

In some embodiments, in cases of autonomous or HAD vehicles, the vehicle may process the reported data (e.g., the location of a variable speed sign) and make a decision on whether to alert the operator or take action (e.g., generate a driving command). In certain embodiments, the navigation device in the vehicle or another computer system in communication with the navigation device may include instructions for routing the vehicle or generate driving commands for steering the vehicle, shifting gears, increasing and decreasing the throttle, and braking based on the reported data.

Flowchart Embodiments

Figure 3:
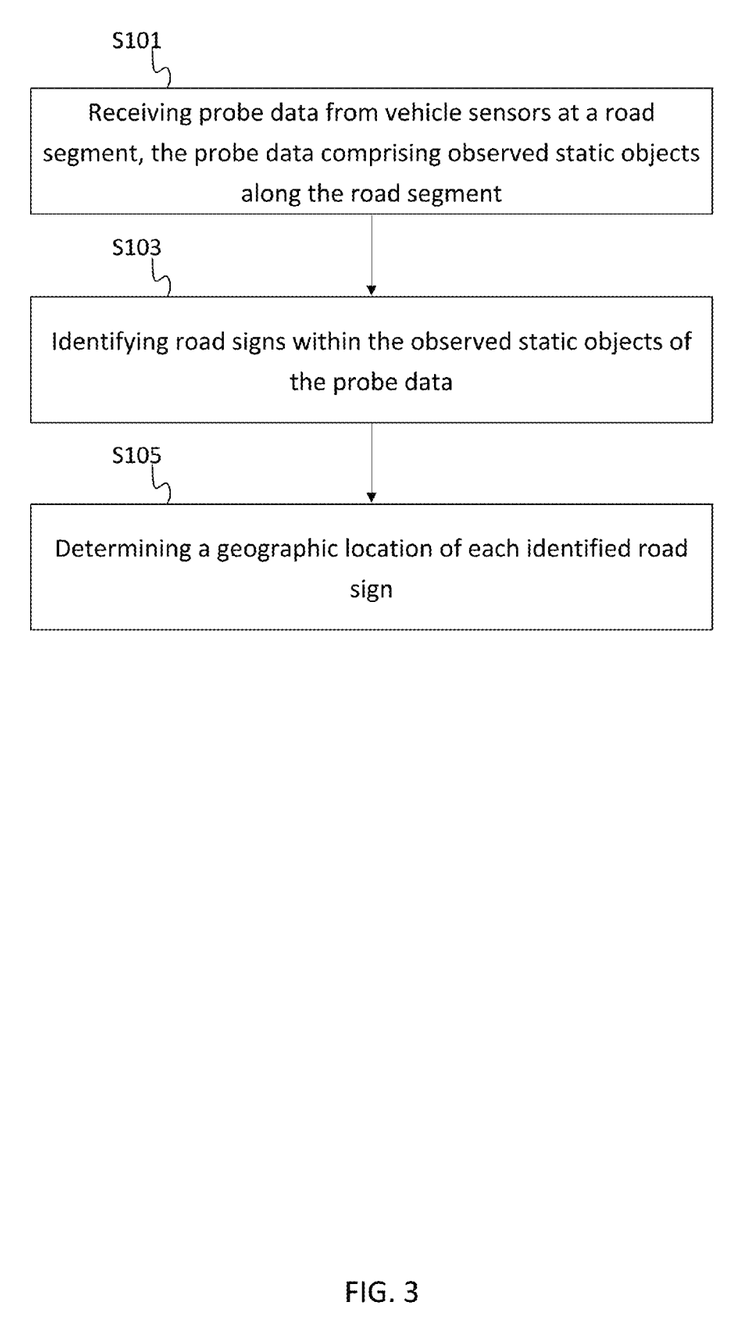
FIG. 3 illustrates an example flowchart for identifying road signs along a road segment using a camera sensor.

FIG. 3 illustrates one embodiment of a flowchart for identifying a road sign and its location along a road segment. The process of the flowchart may be performed by the vehicle sensor, navigation device, and processor and/or a server and its processor. Alternatively, another device may be configured to perform one or more of the following acts. Additional, fewer, or different acts may be included.

At act S101, probe data is received by vehicles traveling along a road segment. The probe data may comprise images or metadata of observed static objects along the road segment.

At act S103, a processor identifies road signs within the observed static objects of the probe data. In certain embodiments, the road signs are identified using a logistic regression algorithm. In some embodiments, the algorithm is trained through a verification of the identified road signs with ground truth data.

At act S105, the processor determines the geographic location of each identified road sign. In certain embodiments, the road sign locations are determined using a linear regression algorithm. In some embodiments, the algorithm is trained through a verification of the geographic location of each road sign with ground truth data.

Navigation and Network System

Figure 4:
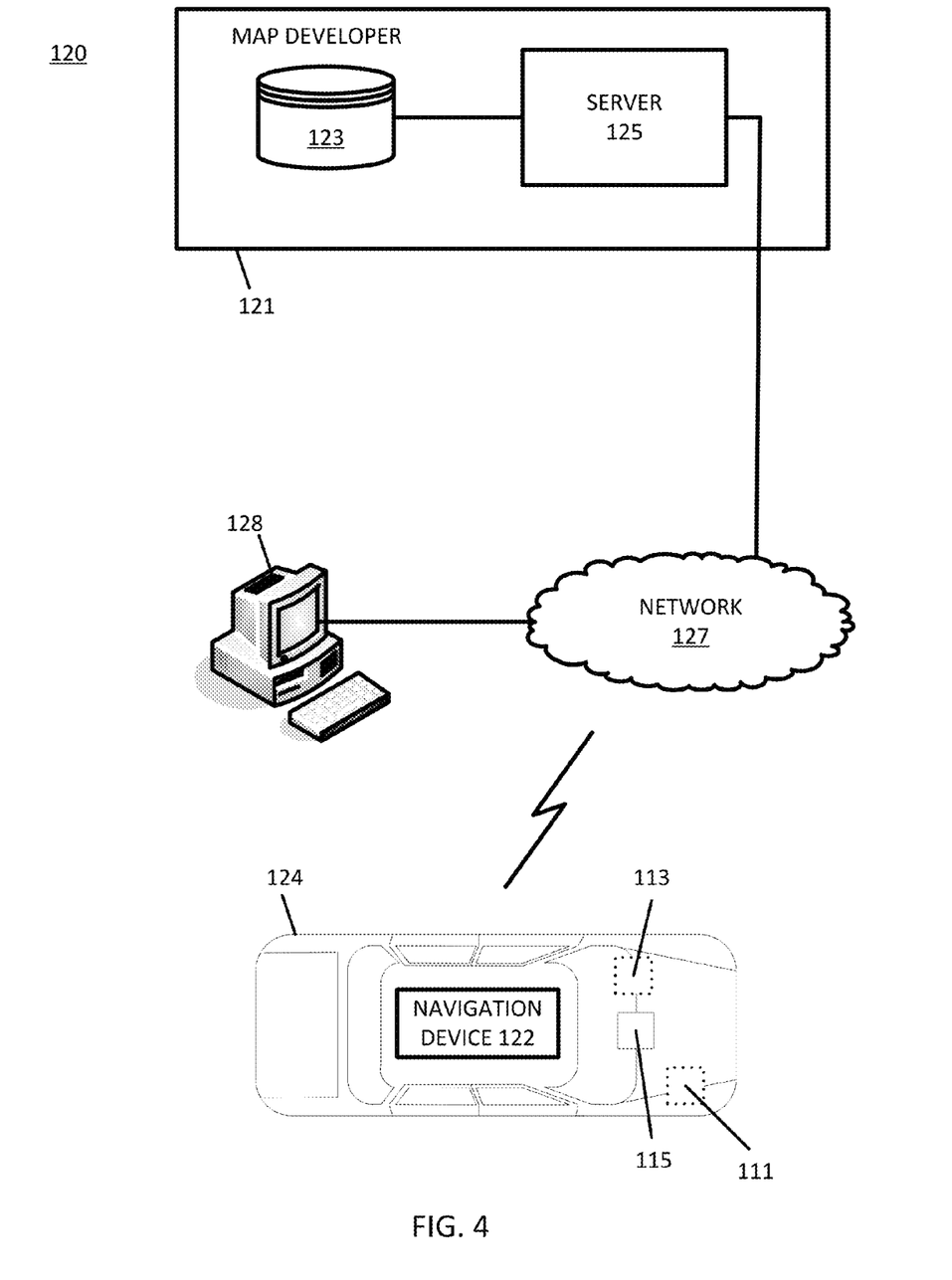
FIG. 4 illustrates an example system for relaying probe data between a vehicle and a data management system.

FIG. 4 illustrates an example system 120 for reporting and processing vehicle probe data from a sensor 111, 113, 115 and/or navigation device 122. The system 120 includes a developer system 121, one or more vehicle sensors 111, 113, 115, one or more navigation devices 122, a workstation 128, and a network 127. Additional, different, or fewer components may be provided. For example, many vehicle sensors 111, 113, 115, navigation devices 122 and/or workstations 128 connect with the network 127. The developer system 121 includes a server 125 and a database 123. The developer system 121 may include computer systems and networks of a system operator.

The vehicle sensors 111, 113, 115 and/or navigation device 122 may be carried by or installed within a vehicle 124. In some embodiments, the navigation device 122 may be a specialized autonomous driving computer. The navigation device 122 may calculate a vehicle confidence level based on at least one confidence factor. The confidence factors may be based on sensor data collected at the vehicle, environmental data received through the network 127, or responsiveness of the vehicle 124. Alternatively, the navigation device 122 may report sensor data from the vehicle sensor 111, 113, 115 to the server 125, which calculates the vehicle confidence level.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom.

The developer system 121 includes a server 125 and a server database 123. The developer system 121 may include computer systems and networks of a system operator such as HERE, NAVTEQ, or Nokia Corporation. The server database 123 is configured to store the vehicle probe data.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

The computing resources may be divided between the server 125 and the navigation device 122. In some embodiments, the server 125 performs a majority of the processing for calculating the vehicle confidence value and the comparison with the confidence threshold. In other embodiments, the computing device 122 or the workstation 128 performs a majority of the processing. In addition, the processing is divided substantially evenly between the server 125 and the computing device 122 or workstation 128.

Figure 5:
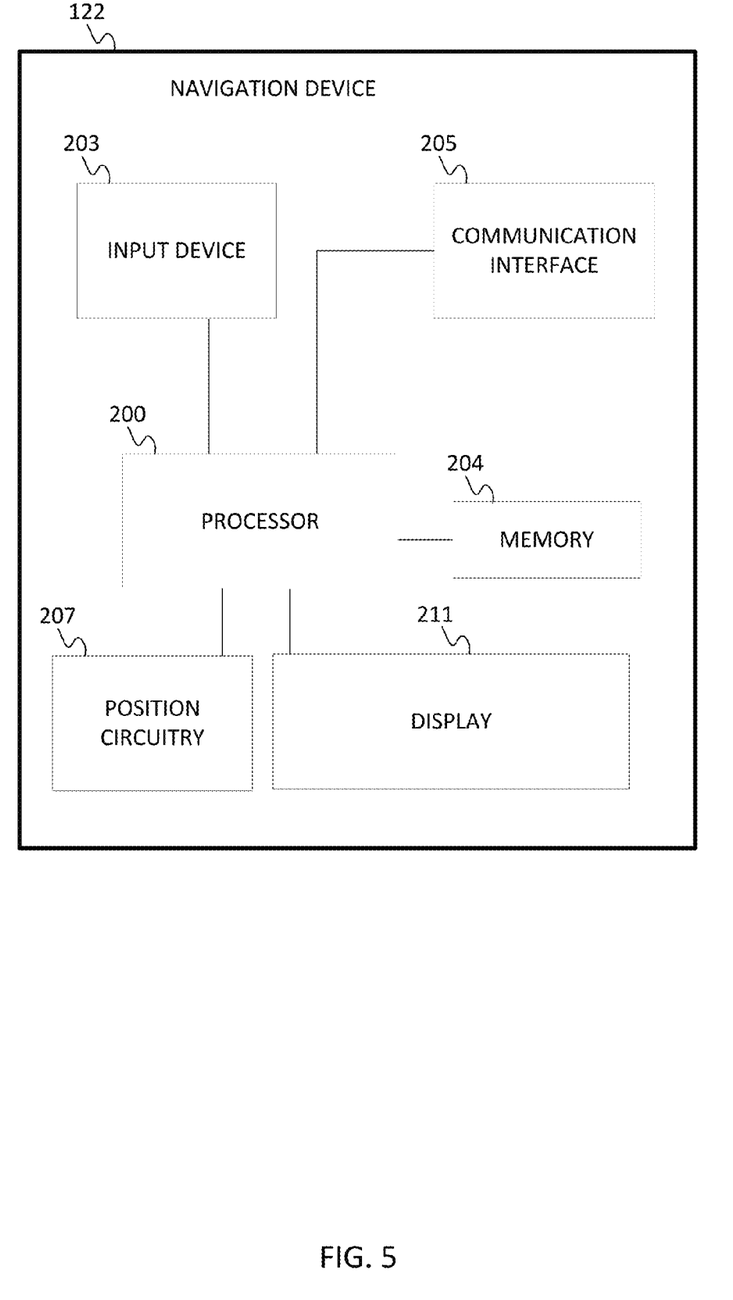
FIG. 5 illustrates an example navigation device of the system of FIG. 4.

FIG. 5 illustrates an exemplary navigation device 122 of the system of FIG. 4. The navigation device 122 includes a processor 200, a memory 204, an input device 203, a communication interface 205, position circuitry 207, and a display 211. Additional, different, or fewer components are possible for the mobile device/personal computer 122.

The processor 200 may be configured to receive sensor data indicative of the location of the navigation device 122 from the position circuitry 207. The processor 200 may also be configured to receive sensor data from a vehicle sensor 115 (e.g., a camera, LIDAR, radar, etc.). The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 6:
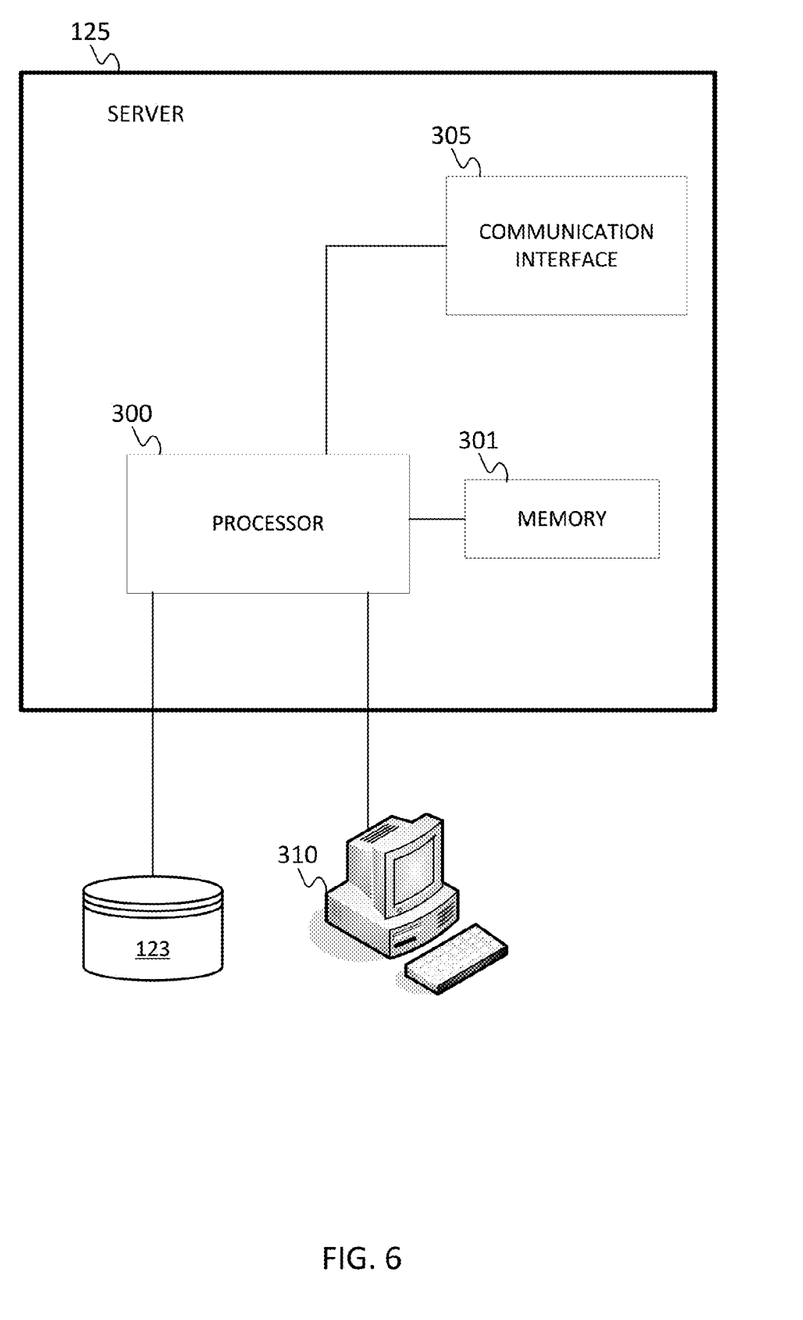
FIG. 6 illustrates an example server of the system of FIG. 4.

FIG. 6 illustrates an exemplary server 125 of the system of FIG. 4. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of methods described above. For example, the navigation device processor 200 may be configured to collect and transmit vehicle probe data for a roadway location.

In another embodiment, the server processor 300 may be configured to compile vehicle sensor data for a plurality of vehicles. The server processor 300 may also be configured to identify road signs along the road segment and determine the location of the identified road signs.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, using a processor, probe data from vehicle sensors from a plurality of vehicles at a road segment, the probe data comprising observed static objects along the road segment;
   identifying, using a logistic regression algorithm, road signs within the observed static objects of the probe data; and
   determining, using a linear regression algorithm, a geographic location for each identified road sign along the road segment.

2. The method of claim 1, wherein one of the road signs is a speed limit sign.

3. The method of claim 2, wherein the speed limit sign is a fixed speed limit sign.

4. The method of claim 2, wherein the speed limit sign is a variable speed limit sign.

5. The method of claim 1, further comprising:
   ascertaining, for each road sign, whether each of the road signs is a fixed road sign or a variable road sign.

6. The method of claim 1, further comprising:
   reporting the determined geographic location of the road signs over a connected network to a traffic developer, a map developer, or a navigation device.

7. The method of claim 1, further comprising:
   reporting data comprising the determined geographic location of the identified road signs over a connected network to a navigation device within an autonomous vehicle or a highly automated driving vehicle;
   processing the reported data within the autonomous vehicle or the highly automated driving vehicle; and
   generating a driving command or alerting an operator of the autonomous vehicle or the highly automated driving vehicle based on the processed data.

8. The method of claim 1, further comprising:
   training the logistic regression algorithm through a verification of the identified road signs with ground truth data.

9. The method of claim 1, further comprising:
   training the linear regression algorithm through a verification of the determined geographic location of each identified road sign with ground truth data.

10. The method of claim 1, further comprising:
    map-matching each road sign to an edge of the road segment or a specific lane of the road segment.

11. A method comprising:
    receiving, using a processor, probe data from vehicle sensors from a plurality of vehicles at a road segment, the probe data comprising observed static objects along the road segment;

identifying, using a logistic regression algorithm, speed signs within the observed static objects of the probe data;

ascertaining, for each speed sign, whether the speed sign is a fixed speed sign or a variable speed sign;

determining, using a linear regression algorithm, a geographic location for each identified speed sign along the road segment; and reporting the determined geographic location of the speed signs over a connected network to a traffic developer, a map developer, or a navigation device.

12. An apparatus comprising:

at least one processor; and at least one memory including computer program code for one or more programs; the at least one memory and the computer program code configured to, with the at least one processor, cause the apparatus to at least perform:

receive probe data from vehicle sensors from a plurality of vehicles at a road segment, the probe data comprising observed static objects along the road segment;

identify, using a logistic regression algorithm, road signs within the observed static objects of the probe data; and determine, using a linear regression algorithm, a geographic location for each identified road sign along the road segment.

13. The apparatus of claim 12, wherein one of the road signs is a speed limit sign.

14. The apparatus of claim 13, wherein the speed limit sign is a fixed speed limit sign.

15. The apparatus of claim 13, wherein the speed limit sign is a variable speed limit sign.

16. The apparatus of claim 12, wherein the at least one memory and the computer program code are configured to cause the apparatus to further perform:

ascertain, for each road sign, whether the road sign is a fixed road sign or a variable road sign.

17. The apparatus of claim 12, wherein the at least one memory and the computer program code are configured to cause the apparatus to further perform:

report the determined geographic location of the road signs over a connected network to a traffic developer, a map developer, or a navigation device.

18. The apparatus of claim 12, wherein the at least one memory and the computer program code are configured to cause the apparatus to further perform:

train the logistic regression algorithm through a verification of the identified road signs with ground truth data.

19. The apparatus of claim 12, wherein the at least one memory and the computer program code are configured to cause the apparatus to further perform:

train the linear regression algorithm through a verification of the determined geographic location of each identified road sign with ground truth data.

20. The apparatus of claim 12, wherein the at least one memory and the computer program code are configured to cause the apparatus to further perform:

map-match each road sign to an edge of the road segment or a specific lane of the road segment.

* * * * *